United States Patent [19]
Oltman

[11] Patent Number: 5,224,835
[45] Date of Patent: Jul. 6, 1993

[54] SHAFT BEARING WEAR DETECTOR
[75] Inventor: Rick C. Oltman, Waterloo, Iowa
[73] Assignee: Viking Pump, Inc., Cedar Falls, Iowa
[21] Appl. No.: 939,922
[22] Filed: Sep. 2, 1992
[51] Int. Cl.$^5$ ............................................. F04D 49/00
[52] U.S. Cl. ..................................... 417/12; 417/32; 417/44; 417/53; 417/63; 417/420; 73/660; 340/683
[58] Field of Search .................... 417/12, 32, 44, 53, 417/63, 420; 73/660; 340/683

[56] References Cited

U.S. PATENT DOCUMENTS

| | | | |
|---|---|---|---|
| 4,257,747 | 3/1981 | Goldman | 417/63 |
| 4,631,683 | 12/1986 | Thomas et al. | 73/660 |
| 4,748,850 | 6/1988 | Kataoka | 73/660 |
| 4,988,979 | 1/1991 | Sasaki et al. | 340/683 |
| 4,998,863 | 3/1991 | Klaus | 417/63 |

Primary Examiner—Richard A. Bertsch
Assistant Examiner—David W. Scheuermann
Attorney, Agent, or Firm—Hill, Steadman & Simpson

[57] ABSTRACT

An apparatus and method for detecting shaft misalignment wherein a sensor is employed to detect contactings between a non-concentrically rotating component and a surface and to generate an electrical signal corresponding thereto, and wherein a signal processing circuit coupled to the sensor is configured to determine whether the signal received from the sensor is characteristic of a signal that is expected whenever a rotating component contacts the surface, and if so, whether the number of signals received exceeds the minimum number expected within a predetermined time interval on the occasion of contact between a rotating component and the surface.

51 Claims, 3 Drawing Sheets

SHAFT BEARING WEAR DETECTOR

BACKGROUND OF THE INVENTION

The present invention generally relates to rotating shafts. More particularly, the invention relates to magnetically driven shafts. Yet more particularly, the invention relates to magnetic drive pumps.

Generally, shafts, for example magnetically driven shafts used in magnetic drive pumps, are made of a relatively tough metal such as steel and supported within bushings that have bearing surfaces on which the shafts can rotate and that serve to maintain shaft alignment. The bushing bearing surfaces generally are made out of a relatively softer material such as brass, bronze, impregnated materials, among others. After a certain amount of use, the bearing surfaces of the bushings can become worn due to the wear of the relatively tough shafts on the relatively soft bearing surfaces. As a result, a shaft can easily become misaligned or skewed in the one or more worn bushings, thereby rotating non-concentrically.

In magnetically driven shafts, one end of the shaft includes magnets secured thereto and a further magnetic field is provided on a driver. The driver magnetic field is rotated about the shaft magnets thereby inducing the shaft to rotate. The driver magnetic field usually is provided as magnets mounted on a driving shaft. However, they can also be provided as electromagnets whose field is rotated.

Generally, a protective sealing or containment can or canister is disposed between the shaft magnets and the driver magnetic field to seal the driven shaft from the driving mechanism. Lubricating fluid is then allowed to flow about the driven shaft but isolated from the driving mechanism. However, as the bushings become worn and the shaft becomes misaligned, there is a danger that the shaft magnets will hit an interior wall of the sealing can, in rotating contact, especially if the arrangement is configured with small tolerances. Similarly, if the driver magnetic field is supported on a rotating shaft secured within bushings, these bushings can become worn and the driver magnetic field can begin to rotate not concentrically and begin contacting the containment can. This rotating contact with the containment can can lead to wear on the can and eventually to a breaking or loss of the sealing function. As a result, there is a danger of leakage through the can.

SUMMARY OF THE INVENTION

The present invention provides an arrangement for detecting undue shaft misalignment or non-concentric rotation, presumably due to the presence of worn bushings. To this end, the present invention provides an arrangement for detecting and analyzing contact between a rotating part and a sealing can, e.g. in a magnetic drive pump. As a result, rotating contact can, e.g. in a magnetic drive pump, be detected before excessive can wear occurs and the pump can be repaired before a catastrophic failure occurs.

In an embodiment, the invention provides a vibration sensor attached to a sealing or containment can or canister of a magnetically driven pump and an electrical or electronic circuit operatively connected to the sensor and configured to process an electrical signal generated by the vibration sensor thereby to count signal pulses representing vibration levels of the can on the order of those which are expected whenever the can is struck by a rotating pump part. In this manner, a predetermined number of signal pulses within a predetermined time span can be considered indicative of a frequent periodic event which can further be considered indicative of contact between a rotating pump component and the containment canister and indirectly, the presence of worn bushings or bearings.

In an embodiment, the invention provides that the vibration sensor is a piezo-electric accelerometer.

In an embodiment, the invention provides that the vibration sensor is mounted directly on the can.

These and other features of the invention will become clearer with reference to the following detailed discussion of the presently preferred embodiments and accompanying drawings.

DETAILED DESCRIPTION OF THE PRESENTLY PREFERRED EMBODIMENTS

In accordance with the invention, component misalignment or non-concentric rotation and, indirectly, bearing or bushing wear, in a magnetically driven shaft construction can be detected by detecting and analyzing vibrations created in an element struck or hit by the misaligned component. To this end, the invention provides for the use of a vibration sensor to pick up vibrations in the element struck by the component and an electrical or electronic circuit operatively configured to determine if a sufficient number of vibration bursts of sufficient magnitude have occurred in a sufficiently short period of time to indicate the likelihood of frequent periodic contactings of the element.

Figure 1:
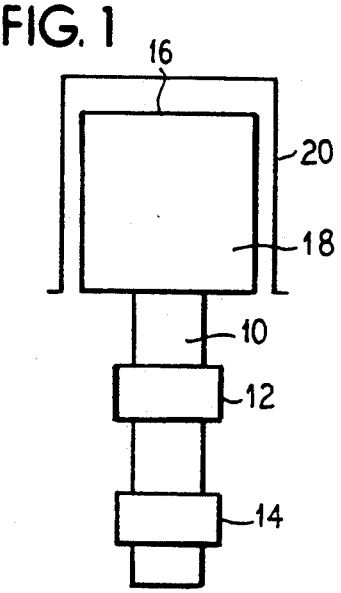
FIG. 1 illustrates a suitably aligned shaft and its relationship to a containment can.

In FIG. 1 there is illustrated a suitably aligned magnetically driven shaft 10 mounted on a pair of bushings 12 and 14. Secured on one axial end 16 of the shaft 10, the driven end, is a magnetic arrangement 18. The driven end 16 of the shaft 10 is concentrically disposed within a containment or sealing can 20 that serves to seal the shaft 10 from a magnetic driven mechanism not shown in this illustration.

Figure 2:
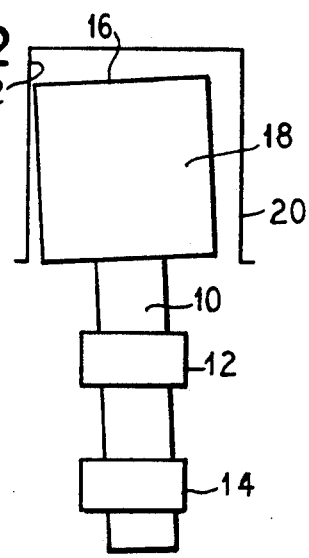
FIG. 2 illustrates a misaligned shaft due to worn bushings and its relationship to the containment can.

As illustrated, as long as the bushings 12 and 14 are suitably aligned and are in good condition, the shaft 10 will remain concentrically disposed within the can 20. However, as illustrated in FIG. 2, should the bushings wear, as they generally do, the shaft 10 will no longer be secured concentrically within the can 20. Instead, the shaft 10 can be skewed and the magnetic arrangement 18 disposed on the driven end 16 can strike against an interior surface 22 of the containment can 20 which will be caused to vibrate or "ring."

In order to better understand the operation of the invention, it is important to understand a few fundamental ideas concerning vibration in matter.

First, one needs to understand the term frequency. Consider two bells, a small bell and a large bell. If one strikes either bell, the sides of the bell will begin to oscillate back and forth or vibrate. The rate at which the bell vibrates is determined by its physical characteristics and is constant for each bell. This rate is referred to as the fundamental frequency of oscillation or pitch of the bell. The small bell will vibrate a relatively high number of times per second and therefore have a "high" pitch or frequency, and the large bell will vibrate a relatively low number of times per second and therefore have a "low" pitch or frequency. It should be noted that the number of times each bell is struck is not the frequency referred to herein, and does not affect the frequency at which any of the bells (or any physical body) vibrates. Furthermore, the intensity with which a bell is struck affects only the loudness of the bell, not the fundamental frequency.

Second, one needs to understand that any physical body will vibrate if energy is imparted to it. When the door of a car is slammed, the car vibrates and one hears the vibration transmitted through air. Without looking, one generally can tell if the door slammed was that of a car of on a truck because each vehicle has a characteristic vibration determined by its mass, materials, shape, and structure. When struck, all physical bodies will somehow vibrate, whether or not humans can detect it.

Last, most of the sounds or vibrations one detects are not due to vibrations at a single frequency, but rather are due to vibrations at several frequencies simultaneously, the fundamental frequencies and harmonics thereof. A trumpet and a clarinet may play the same musical note (which is at a given frequency), but they excite different groups of vibrations associated with the note, and thus sound different. Likewise, noises associated with machinery are groups of vibrations at many different frequencies occurring at the same time. Thus, one may state, for example, that a certain pump, while exhibiting vibrations across a very broad frequency spectrum from a few cycles/second to several tens or even hundreds of thousands of cycles/second, is noisy in the 400 to 800 cycles/second band, indicating that the pump vibrates with greater intensity at frequencies in this range.

Understanding these few ideas, one can move on to the basic premise of the invention: if a moving object strikes the containment can 20, the can will vibrate. Furthermore, it will vibrate differently than another part struck by the same blow. Thus, if one can detect vibrations of the can and isolate as best possible these vibrations from the vibrations of nearby objects (pump, motor, bracket, etc.), one will be able to detect if the can has been struck by a moving object.

It is important to note here that the above statement reflects an ideal, and that in the actual implementation of the invention a number of compromises and approximations might be necessary. In fact, if it were possible to isolate perfectly the vibration of the containment can, the vibration sensor would not have to be attached to the can itself—any location on the pump would suffice. In reality, this has not been found to be workable, instead it has been determined that it is better to mechanically couple the sensor to the can in order to be close to the source of the can vibrations.

Thus, a basic idea of the invention is as follows: attach a sensor to the containment can and obtain a voltage signal representing the can vibrations. Then, eliminate from the signal those components which represent vibrations at frequencies associated with the motor and pump. At that point, one then has isolated the portions of the signal which represent vibrations of the can itself. The can essentially is a bell, and in accordance with the invention, processing circuitry can then "listen" to hear if the can has been "rung."

It is apparent that the can will be "rung" by other than blows to the can. In fact, a hammer struck anywhere near a pump will "ring" the can. It is undesirable to have these false alarms because they may cause the shut down of the pump, so further steps must be taken to isolate ringing of the can due to, impingement of moving pump parts. To do this, one can make an assumption: if a rotating part strikes the can, it will continue to do so on a more or less regular basis thereafter. Thus, one can count the number of times a signal indicating that the bell has been rung in a given time period (e.g. 30 seconds) is received. If this number is less than a preselected number (e.g. 60), one can regard it as a random event not associated with rotating machinery contacting the can. If, however, the number is greater than the preselected number, one can assume that the can has been struck on a regular basis, indicating contact of the can by rotating machinery, and thus, equipment failure.

Moreover, because the can will vibrate only at fundamental frequencies determined by its physical properties but also at harmonics thereof, the harmonics will also be generated with regularity. Thus, in accordance with the invention, one can eliminate selected spectral portions of the can vibration response including those of the fundamental vibrational frequencies and yet still detect "ringings" of the can by counting vibration bursts that are comprised of harmonics of the fundamental frequencies. The vibration bursts in this case represent the sum of the harmonics remaining in the signal after removal of undesired portions of the spectrum. Selected segments of the vibrational spectrum may be undesirable because they are: (a) close to the fundamental vibration frequencies of other pump components; and/or (b) present with great magnitude only at points on the canister surface to which access by a sensor is not possible.

Figure 3:
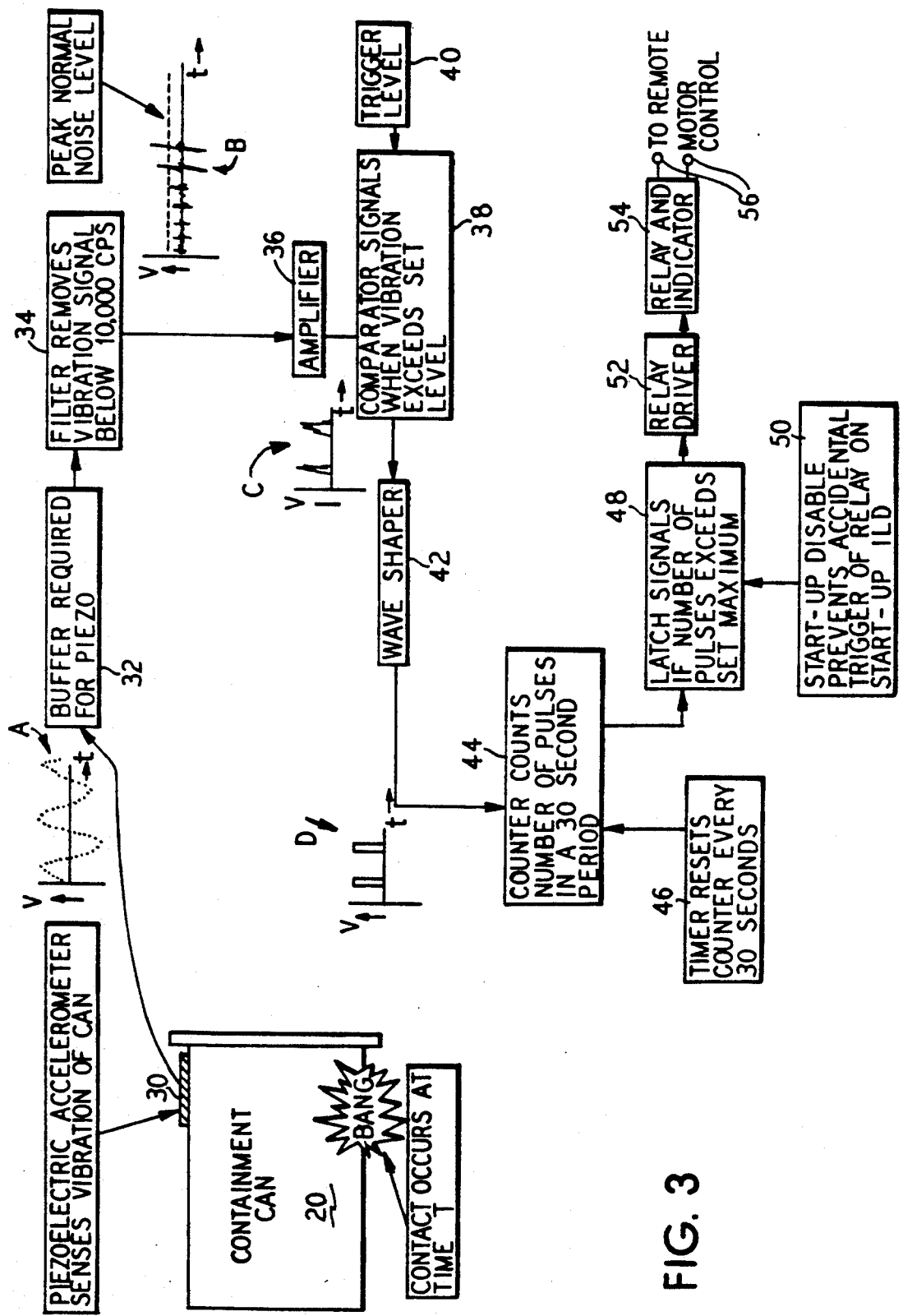
FIG. 3 illustrates a block diagram of an arrangement for detecting shaft misalignment.

In FIG. 3 there is illustrated an arrangement for detecting and analyzing vibrations in the containment can 20 so as to identify misalignment of the shaft due to, for example, worn bushings. Early detection of such misalignment can be used to shut-down the driver or motor thereby preventing costly, excessive wear and tear.

In the arrangement of FIG. 3, a piezo-electric accelerometer 30 is placed in contact with the can 20 by, for example, direct mounting thereon. The accelerometer 30 in turn generates an electrical signal A corresponding to movement of the accelerometer 30 caused by, e.g., vibrations in the can 20.

In the illustrated embodiment, the signal A generated by the accelerometer 30 is coupled to an electrical buffer 32 which isolates the accelerometer 30 from the processing circuitry. This processing circuitry determines how often and how frequently a signal is received that has the character of a signal associated with a blow to the can 20.

To this end, an output of the buffer 32 is coupled to a filter 34 which removes components of the electrical signal having frequencies not known to be fundamental vibration frequencies of the containment canister or harmonics thereof. This filter 34 eliminates noise in the vibration signal caused by, for example, the motor used to drive the magnet driver, and produces an output signal B which is a filtered vibration signal consisting primarily of selected fundamental vibrational frequencies and/or harmonics of selected fundamental vibrational frequencies of the containment canister 20.

The output signal B of the filter 34 is coupled to an amplifier 36 which serves to increase the overall level of the filtered vibration signal. The amplified and filtered vibration signal is then compared to a trigger level voltage by means of a comparator 38. The trigger level is set by a voltage divider which is set by an operator as described below. The purpose of the comparison is to determine if sufficiently strong vibrations are produced in the can so as to warrant an interference of a striking there against, e.g., by a rotating pump component, be it the driven shaft end or a rotating driver magnetic field component.

The comparator is configured so as to exhibit a positive, non-zero output only when the vibration signal amplitude is more positive than the trigger level. The signal is then passed through diode D1. The result is the generation of rectified signal C.

Because the resulting rectified signal C is difficult to work with, the signal C is directed to a monostable multivibrator 42. The monostable multivibrator 42 produces a defined square pulse signal D from the signal C thereby producing a defined digital pulse for each analog signal burst C representing vibration from the canister 20 of sufficient magnitude as to warrant an inference of a blow upon the canister, e.g. by a rotating pump component.

The output signal D of the monostable multivibrator 42 is directed into a counter 44 which continuously counts the number of pulses in signal D. However, the accumulated count in this counter 42 is reset to zero at regular intervals of time by means of a reset signal generated by timer 46. As a result, the accumulated count in the counter 44 only pertains to the number of pulses received in the most recent periodic time interval. The time interval at which reset pulses are generated by the timer 46 can be varied in order to optimize the performance of the bearing wear detector.

An output of the counter 44 is coupled to a latch circuit 48. When a predetermined count is reached in the counter 44, an output of the counter 44 sets the latch circuit 48 so that the circuit maintains recognition that the predetermined number of counts has been exceeded regardless of whether the counter 44 is reset by the reset timer 46.

To prevent accidental tripping of the latch circuit during a state of circuit instability immediately following power-up, a time-out circuit 50 disables the latch circuit for a short period of time following power-up. This disable circuit 50 allows the magnetic drive pump and circuitry associated therewith to commence operation without nuisance shut-down.

As further illustrated, an output of the latch circuit 48 is directed to a relay driver 52. The relay driver 52 is in turn used to drive a relay and indicator arrangement 54. The relay can be used to shut down the motor driving magnetic driver or to set off an alarm. Alternatively, as illustrated, further outputs 56 from the relay 54 can be provided to direct an appropriate signal to a remote motor control.

Figure 4:
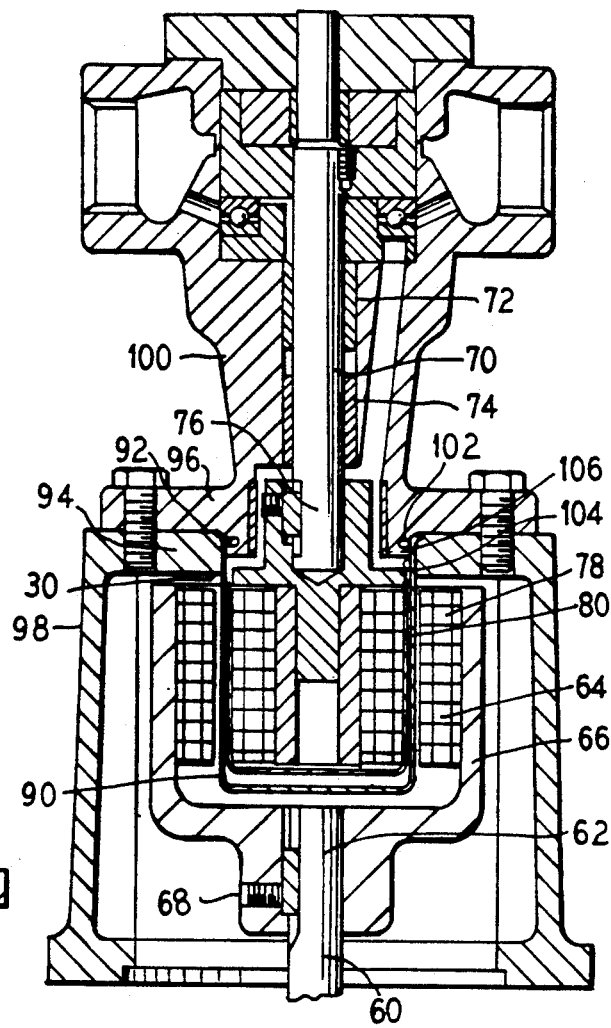
FIG. 4 illustrates one configuration for detecting vibrations in a containment can.

In FIG. 4 there is illustrated, in cross-section, a typical magnetic drive configuration. As illustrated, a first shaft 60 is driven by a motor, not illustrated, but understood to be present. Mounted on a driving end 62 of the shaft 60 is a magnetic field 64 in the form of permanent magnets. These magnets 64 are attached to the interior of a relatively large bell housing 66 which, in turn, is secured to the driving end of the shaft 60 by means of, e.g., a set screw 68.

As is known, a rotating magnetic field, e.g. generated by rotating the magnets 64, can be used to induce rotation in another shaft. To that end, axially aligned with the first shaft 60 is a second, driven shaft 70. The shaft 70 is seated and secured within bushings 72 and 74 which serve to maintain axial alignment as well as to provide a bearing surface.

Secured on a driven end 76 of the shaft 70 are magnets 78. The magnets 78 are secured within a housing 80 which, in turn, is secured to the driven end 76 of the shaft 70.

As illustrated, the magnets 78 are concentrically disposed within the interior of the bell housing 66 and the magnets 64. Thus, the magnetic fields of the magnets 64 directly affect the magnets 78.

As is also known, the use of a magnetic drive pump is particularly useful in situations wherein the driving mechanism is to be kept isolated from the driven mechanism. To this end, a cylindrical containment or sealing can or canister 90 is secured in fixed sealing relationship between the bell housing 66 and magnets 64 and the housing 80.

As illustrated, the can 90 includes a lower lip 92 secured between flanges 94 and 96 of driving shaft housing 98 and driver shaft housing 100, respectively. An O-ring 102 operatively disposed between an interior 104 of the can 90 and a shoulder 106 of the flange 96 serves to seal the interior of the can in fluid communication with the interior of the driven shaft housing 100. As is known, oil or other fluids used to lubricate the driven shaft 70 are isolated from the driving arrangement by means of this sealing relationship.

As also illustrated in FIG. 4 and FIG. 3, the sensor 30 can be, and preferably is, directly mounted on an outer surface of the containment can 20 or 90. In both FIGS. 3 and 4, the sensor 30 is mounted on a sidewall so as to have the best position for being affected by "ringing" of the can 20 or 90.

Figure 5:
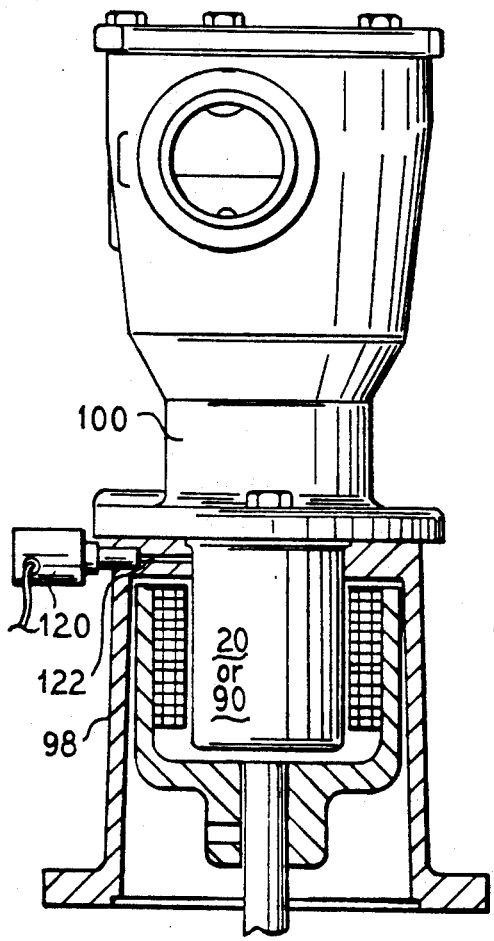
FIG. 5 illustrates in cross-sectional view a magnetically driven shaft and its driver.

However, in FIG. 5, there is illustrated how in another embodiment, the sensor 30 can be suitably, mechanically coupled to the containment can 20 or 90 and yet be located outside of the driving shaft housing 98. To this end, the sensor 30 is suitably secured within a sensor housing 120 and a probe 122 is extended from the housing 120 to the can 20 or 90. As can be appreciated, vibrations in the can 20 or 90 will be transmitted through the probe 122 directly to the sensor 30.

Figure 6:
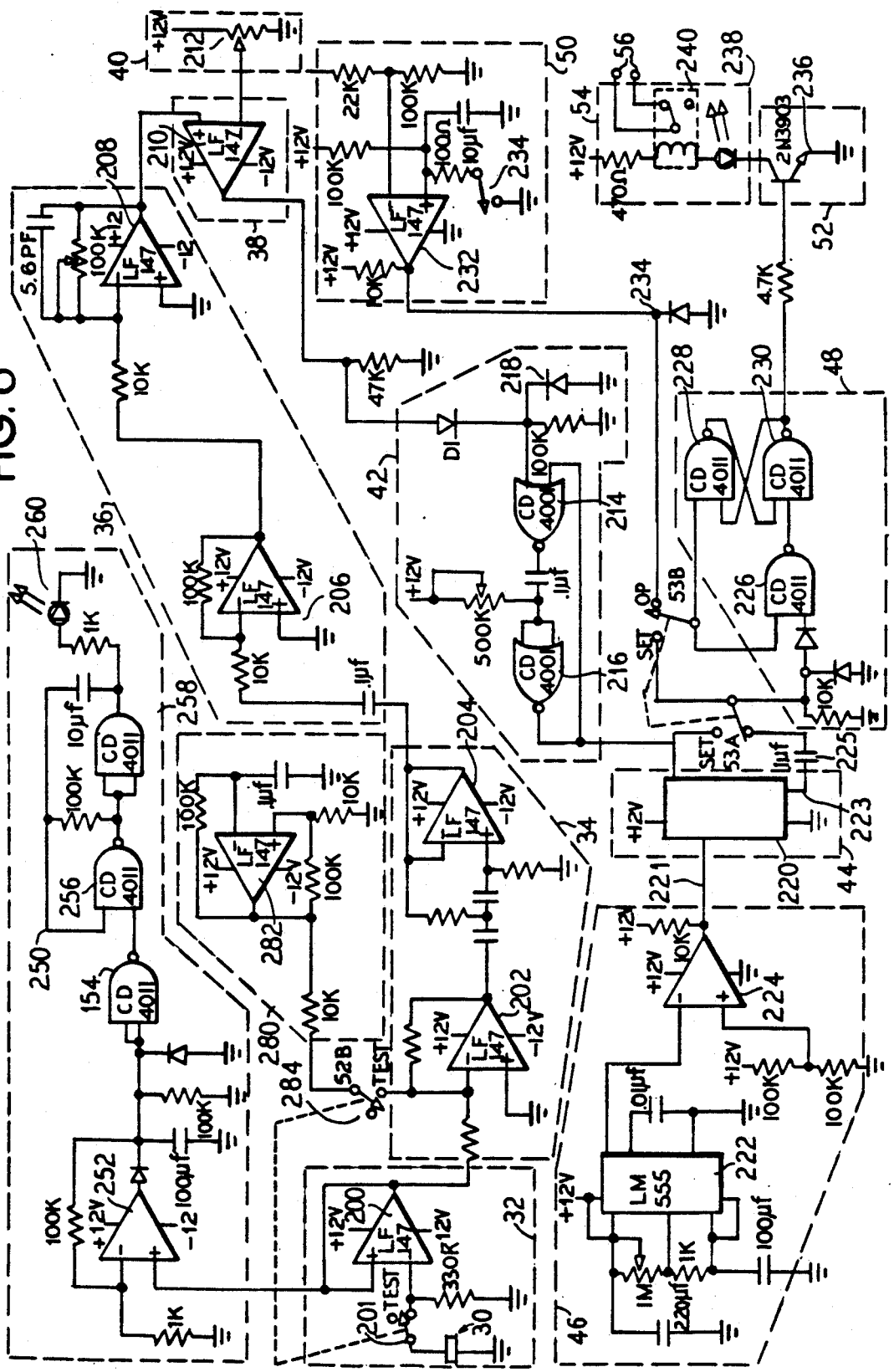
FIG. 6 illustrates a schematic of an electrical or electronic circuit for processing electrical signals generated by the vibration detector of FIGS. 3 or 4 as set forth in the block diagram of FIG. 3.

In FIG. 6 there is illustrated a schematic of an electrical circuit for implementing the block diagram circuit of FIG. 3. The various blocks of the block diagram of FIG. 3 are identified in FIG. 6 by means of broken lines.

As illustrated, the vibration signal A generated by the piezo-electric accelerometer 30 is directed into an input buffer 32 formed by an operatively configured operational amplifier 200, preferably of the type referred to as LF 147. A test switch 201 preferably is interposed between the sensor 30 and the operational amplifier 200 as part of a testing circuit.

The output of the operational amplifier 200 is then directed into a band-pass filter 34 made up of operational amplifiers 202 and 204 which provide a high-pass filter, and capacitor 205 of amplifier 36 which provides a low-pass filter. The band-pass filter 34 exhibits a center frequency selected so as to remove unwanted motor and pump noise, etc. from the vibration signal A. The operational amplifiers 202 and 204 are of the type LF 147.

As described above, the filter 34 outputs a harmonic signal B that is then directed into an amplifier 36. The amplifier 36 increases the amplitude of the analog pulses so that they can be utilized by following circuitry.

As illustrated, the amplifier 36 preferably is comprised of a series of two operational amplifiers 206 and 208 of the type LF 147, each operatively configured to provide amplification of one-half the overall amplification desired. This configuration serves to maximize the bandwidth of the amplifier 36.

The output of the amplifier 36 is then directed into the comparator 38 preferably comprised of an operational amplifier 210 referred to as an LM 139. The other trigger input 40 of the comparator 38 is provided by a voltage level provided through a voltage divider tied to the supply voltage. To this end, the trigger input 40 is provided by means of a potentiometer 212 set to a desired level. As described below, this potentiometer 212 is set by the operator or installer who sets the sensitivity of the processing circuitry.

The output of the comparator is the above-described signal C that is then provided to a wave shaper 42. The wave shaper as is known turns the analog pulses of the signal C into a square wave pulse signal D. This is accomplished by the use of two operatively configured NOR gates 214 and 216 referred to as the type CD 4001.

At the input of the wave shaper 42, there is also provided a germanium diode 218 coupled thereto that is operatively coupled to eliminate any possible negative voltage at the input of the CD 4001. This serves to protect the circuitry of the wave shaper 42.

The wave shaping provided by the wave shaper circuitry 42 is non-retriggable and produces pulses of approximately 10 ms. in the form of the above-described signal D.

The signal D is then directed into the counter 44 preferably comprising a counter 220 of the type referred to as CD 4040. Coupled to a reset terminal 221 of the counter 220 is the timer reset circuitry 46. This reset timer circuitry 46 includes a operatively configured timer 222 referred to as the type LM 555, or 555 timer whose output is directed through an operational amplifier 224 of the type referred to as LM 139. This configuration of the timer reset circuitry 46 is configured to produce an output pulse at regular time intervals that serves to, in turn, reset the count of the counter 220 to zero. In this way, should the number of pulses issued from the wave shaper 42 within the predetermined time interval be fewer than a preselected number, the counter will be reset to zero without issuance from the counter 220 of a signal indicative of an occurrence of contact between the containment canister and a rotating pump component.

However, should an excessive number, for example, above 64, of pulses occur within the time interval defined by the reset timer circuit configuration 46, a digital high signal will be seen at a given pin 223 of the counter 220. This output signal will be AC coupled through a capacitor 225 to the latch circuit 48.

As illustrated, the latch circuit 48 is operatively configured by means of three NAND gates 226, 228, and 230 to provide a flip-flop. Once the latch circuit 48 is set, it will provide a high status digital signal to the following relay driver 52.

As illustrated, the relay driver 52 preferably comprises an NPN junction transistor 236, preferably of the type 2N3903. This relay driver in turn is coupled in series with a light emitting diode 238 and relay 140, which together form the indicator and relay 54. The relay 240 can be used to disconnect motor controller contacts through terminals 56 while the light emitting diode 238 can light up and visually indicate the occurrence of excessive misalignment of the shaft. Preferably, the light emitting diode 238 is red and can be referred to as a "FAULT" light.

Also illustrated as an input to the latch circuit 48 is the start-up disable circuit 50 which, upon turn on, prevents the latch circuit 48 from providing a high state digital output signal to the relay driver 52. The start-up disable circuit 50 as illustrated, comprises an operatively configured operational amplifier 232 of the type referred to as LM 139. Switch 234 connected to the positive input of the operational amplifier 232 provides a reset function so that should an accidental tripping of the circuit occur, it can be reset.

In the illustrated embodiment, a further feature is provided not described in the block diagram of FIG. 3. To this end, there is further included a circuit arrangement 250 coupled to the output of the buffer circuit 32. This circuit 250 provides a visual indication of the connection status of the sensor 30 to the signal processing circuitry.

To this end, a series arrangement of an operational amplifier 252 and NAND gates 254, 256, and 258 provide a signal to a light emitting diode 260 should a connection between the sensor 30 and the buffer circuit 32 not be present. Should the sensor 30 not be connected to the operation amplifier 200, the output of the operational amplifier 200 will be zero and thus, the series connection of operational amplifier 256 and NAND gate 254 will enable NAND gates 256 and 258 to produce an intermittent "ON" signal for the light emitting diode 260, thereby causing it to flash. Alternatively, should the sensor 30 be connected to the buffer circuit 32, a signal will not be enabled for the light emitting diode 260.

The light emitting diode 260 preferably is colored yellow and can be referred to as a "SIGNAL FAULT" light.

In operation, an installer or operator, upon installation of the circuit, will refine the circuit by setting the variable resistors in the signal processing circuit so that an optimum detection level is obtained.

To this end, a magnetic drive pump preferably is operated for 2 hours before the detection circuitry is set. The motor controller relay 240 should remain disconnected during this time. This allows the pump to settle into the normal operating conditions of the installation site.

Later, while the pump is operating and the motor control relay 240 is still disconnected, the operator or installer follows the following steps:

1. Check to see that the yellow "SIGNAL FAULT" light is not flashing. If the pump sensor 30 is properly attached to the canister and the jacks, plugs, and input cable from the sensor 30 to the circuitry are in proper working order, the "SIGNAL FAULT" light will remain off.

2. Switch switch 201 to its set position to couple the sensor 30 to the processing circuitry.

3. Set the potentiometer 212 to highest trigger level. If can fault light is on, press reset switch 234.

4. Slowly set the potentiometer 212 to a lower trigger level, until the "CAN FAULT" light 238 comes on.

5. Slowly raise the trigger level of the potentiometer 212 until the "CAN FAULT" light 238 just goes off. Observe the "CAN FAULT" light 238 for a few minutes and make sure that it does not flash on periodically. If it does, set the potentiometer 212 to a higher trigger level until light 238 remains off.

6. Switch unit to operate position. Connect motor controller relay 240 if desired. At this point, the circuitry is ready to use.

It may be desirable to periodically test the warning system or automatic shut-down system for proper operation. To this end, there is provided a test circuit 280 comprised of an operatively configured operational amplifier 282 of the type LF 147. The output of this amplifier 282 is substituted for the output of the amplifier 200 by means of a further set of switch contacts 284 provided on switch 201. Therefore, to test the system, the operator should depress the "test" switch 201 and hold for a few seconds. The pump sensor 30 will be disconnected and a simulated fault signal will be injected into the circuitry. The system should react as if there were a "CAN FAULT." To restart, the operator then presses the "reset" switch 234.

While preferred embodiments have been shown, modifications and changes may become apparent to those skilled in the art which shall fall within the spirit and scope of the invention. It is intended that such modifications and changes be covered by the attached claims.

Moreover, it is important to remember that the can or canister can be caused to "ring" by a variety of rotating components including the driver magnetic field and/or the driven shaft end. Thus, the term "rotating component" should be interpreted broadly.

What is claimed is:

1. An apparatus for detecting non-concentric rotation of a rotating component, comprising:
   a surface operatively positioned to be contacted by an end of the part should it rotate non-concentrically;
   a sensor operatively mounted on the surface to detect vibrations induced in the surface, including vibrations produced by contact between the rotating component end and the surface, and to generate a vibration signal; and
   an electrical circuit operatively coupled to the sensor and configured to process the vibration signal generated by the sensor, the electrical circuit determining if a number of signals of sufficient strength so as to represent possible impingement upon the surface by the rotating component occur within a predetermined time frame.

2. The apparatus of claim 1, wherein the surface is a can-shaped member.

3. The apparatus of claim 1, wherein the sensor is a piezo-electric accelerometer.

4. The apparatus of claim 1, wherein the electrical circuit contains means for setting a sensitivity level such that only signals of sufficient magnitude so as to warrant the inference of contact between the surface and the rotating component are counted.

5. The apparatus of claim 1, wherein the rotating component is a shaft end.

6. The apparatus of claim 1, wherein the rotating component is a driver field in a magnetic pump.

7. The apparatus of claim 1, wherein the electrical circuit further comprises a comparator and a wave shaper operatively positioned and coupled to convert the filtered vibration signal into a square wave pulse upon the occasion of the filtered vibration signal having reached sufficient magnitude to warrant the inference of impingement upon the surface by the rotating component.

8. The apparatus of claim 7, wherein the comparator is operatively coupled to a voltage divider circuit and to the filtered vibration signal so as to compare the relative amplitude of the voltage from the voltage divider and the peak voltage of the vibrational signal, and exhibit a positive non-zero output only when the peak voltage of the vibrational signal exceeds the voltage level input to the comparator by the voltage divider circuit.

9. The further apparatus of claim 7, wherein the output of the comparator is operatively configured to allow output voltage levels only between ground (zero) and positive supply in order to simulate at the output of the comparator, an analog device, a signal acceptable to the following stage of the circuit, a CMOS digital device.

10. The further apparatus of claim 7, wherein the wave shaper is a non-retriggerable monostable multivibrator, a CMOS device, operatively configured to output a 10 ms square wave pulse upon receipt from the comparator of a voltage signal exceeding that voltage level considered to represent a logical true to a CMOS logic gate.

11. The apparatus of claim 1, wherein the electrical circuit further includes a digital counter with a reset input and operatively coupled to count the digital pulses.

12. The apparatus of claim 11, wherein the electrical circuit further comprises a timer having an output operatively coupled to the reset input of the digital counter such that the count of the digital counter is reset to zero at periodic intervals.

13. The apparatus of claim 1, wherein the electrical circuit includes a latch circuit coupled to the digital counter whose output is latched into a digital ON state whenever a sufficient number of digital pulses are counted within the periodic interval of the reset timer.

14. The apparatus of claim 13, wherein the electrical circuit further includes a relay driver and relay mechanism operatively coupled to the latch circuit output.

15. The apparatus of claim 14, wherein the electrical circuit further includes a visual indicator operatively coupled to the relay driver so as to be energized whenever the relay driver is energized.

16. The apparatus of claim 1, wherein the electrical circuit contains a filter operatively coupled to filter out unwanted signal components in the vibration signal, thereby generating a filtered vibration signal.

17. The apparatus of claim 16, wherein the filter is a band-pass filter that filters out signal components not associated with one or more fundamental vibrational frequencies of a pump element and/or harmonics of one or more of the fundamental vibrational frequencies of a pump element thereby generating a filtered vibration signal.

18. An apparatus for detecting non-concentric rotation of a magnetic driver shaft or a magnetically driven shaft which are isolated from each other by means of a containment canister shaft, comprising:

a sensor mounted to detect vibrations in the canister, including vibrations produced by contact between one or both shafts and a surface of the canister, and to produce a vibration signal; and an electrical circuit operatively coupled to the sensor and configured to process the vibration signal produced by the sensor, the electrical circuit determining if a number of signal pulses of a type characteristic of those expected when the containment canister has been impinged upon by a rotating pump component have been detected within a predetermined time frame.

19. The apparatus of claim 18, wherein the sensor is mounted directly on the containment canister.

20. The apparatus of claim 18, wherein the sensor is a piezo-electric accelerometer.

21. The apparatus of claim 18 wherein the electrical circuit includes means for setting a sensitivity level such that only input signal pulses representing vibration levels of the canister on the order of those which are to be expected whenever the canister is struck by a rotating component part are counted.

22. The apparatus of claim 18, wherein the electrical circuit includes a filter operatively coupled to filter out unwanted signal components in the vibration signal, thereby generating a filtered vibration signal.

23. The apparatus of claim 22, wherein the filter is a band-pass filter that filters out signal components that are:

not associated with one or more fundamental vibrational frequencies of the canister; or not associated with harmonics of one or more fundamental vibrational frequencies of the canister.

24. The apparatus of claim 22, wherein the electrical circuit further comprises a wave shaper operatively positioned and coupled to convert the filtered vibration signal from an analog signal into a digital square wave pulse signal produced whenever the analog signal magnitude exceeds a level associated with vibrational levels of the canister expected whenever the rotating component impinges upon the canister.

25. The apparatus of claim 24, wherein the electrical circuit further includes a digital counter with a reset input and operatively coupled to count the digital pulses.

26. The apparatus of claim 25, wherein the electrical circuit further comprises a timer having an output operatively coupled to the reset input of the digital counter such that the count of the digital counter is reset to zero at periodic intervals.

27. The apparatus of claim 26, wherein the electrical circuit includes a latch circuit coupled to the digital counter whose output is latched into a digital ON state whenever a sufficient number of digital pulses are counted within the periodic interval of the reset timer.

28. The apparatus of claim 27, wherein the electrical circuit further includes a relay driver and relay mechanism coupled to the output of the latch circuit.

29. The apparatus of claim 28, wherein the electrical circuit further includes a visual indicator operatively coupled to the relay driver so as to be energized whenever the relay driver is energized.

30. In a magnetic drive pump having a magnetically driven shaft isolated from a magnetic driving field by means of a containment canister, the improvement comprising:

a sensor operatively mechanically coupled to an exterior surface of the containment canister to detect vibrations induced in the canister, including vibrations produced by contact between the driven or driver shaft end and an interior or exterior surface of the canister, and to produce a vibration signal; and an electrical circuit operatively coupled to the sensor and configured to process the vibration signal produced by the sensor, the circuit determining if an excessive number of signal pulses representing vibration levels of the canister on the order of those expected whenever the canister is struck by a rotating component occur within a predetermined time frame.

31. The magnetic drive pump of claim 30, wherein the sensor is mounted directly on the canister.

32. The magnetic drive pump of claim 30, wherein the sensor is a piezo-electric accelerometer.

33. The magnetic drive pump of claim 30 wherein the electrical circuit includes means for setting a sensitivity level such that only signals equal to or greater than a level expected whenever a rotating pump component impinges upon the surface of the containment canister are counted.

34. The magnetic drive pump of claim 30, wherein the electrical circuit includes a filter operatively coupled to filter out unwanted signal components in the vibration signal, thereby generating a filtered vibration signal.

35. The magnetic drive pump of claim 30, wherein the filter is a band-pass filter that filters out signal components that are:

not associated with one or more fundamental vibrational frequencies of the canister; or not associated with harmonics of one or more fundamental vibrational frequencies of the canister.

36. The magnetic drive pump of claim 30, wherein the electrical circuit further is comprised of a wave shaper operatively positioned and coupled to convert the filtered vibration signal from an analog signal into a digital square wave pulse signal produced whenever the analog signal magnitude exceeds a level associated with vibrational levels of the canister expected whenever a rotating pump component impinges upon the canister.

37. The magnetic drive pump of claim 36, wherein the electrical circuit further includes a digital counter with a reset input and operatively coupled to count the digital pulses.

38. The magnetic drive pump of claim 37, wherein the electrical circuit further comprises a timer having an output operatively coupled to the reset input of the digital counter such that the count of the digital counter is reset to zero at periodic intervals.

39. The magnetic drive pump of claim 38, wherein the electrical circuit includes a latch circuit coupled to the digital counter and whose output is latched into a digital ON state whenever a sufficient number of digital pulses are counted within the periodic interval of the reset timer.

40. The magnetic drive pump of claim 39, wherein the electrical circuit further includes a relay driver and relay mechanism operatively coupled to the latch circuit output.

41. The magnetic drive pump of claim 40, wherein the electrical circuit further includes a visual indicator operatively coupled to the relay driver so as to be energized whenever the relay driver is energized.

42. A process for detecting non-concentric rotation of a shaft in a magnetic drive pump, the magnetic pump having a magnetically driven shaft isolated from a magnetic driving field by means of a containment canister isolating the driven shaft from the driving field, the process comprising the steps of:

sensing vibrations in the containment canister;

producing an electrical vibration signal relating thereto; and processing the electrical signal to determine if an excessive number of signals representing vibrational levels of the canister of sufficient magnitude to warrant an inference of impingement of a rotating component upon the surface of the canister are detected within a predetermined time interval.

43. The process of claim 42, wherein the vibrations in the containment canister are sensed by means of a piezoelectric accelerometer.

44. The process of claim 42, comprising the step of setting a sensitivity level such that only signals characteristic of those to be expected whenever the rotating component strikes a surface of the containment canister are counted.

45. The process of claim 42, comprising the step of filtering out unwanted signal components in the vibration signal, thereby generating a filtered vibration signal.

46. The process of claim 45, comprised of the step of band-pass filtering the vibration signal so as to remove frequency components that are:

not associated with one or more fundamental vibrational frequencies of the canister; or not associated with harmonics of one or more fundamental vibrational frequencies of the canister.

47. The process of claim 45, comprised of the step of wave shaping the filtered and rectified analog vibration signal into a digital square wave pulse signal.

48. The process of claim 47, comprising the step of counting the digital pulses with a digital counter.

49. The process of claim 48, comprising the step of resetting the count of the digital counter is reset to zero at periodic intervals.

50. The process of claim 49, comprising the step of setting a latch circuit into a digital ON state whenever a sufficient number of digital pulses are counted within a periodic interval of the reset timer.

51. The process of claim 50, comprising the step of energizing a relay driver with the latch circuit.

* * * * *